United States Patent Office 3,403,139
Patented Sept. 24, 1968

3,403,139
UNSATURATED LINEAR COPOLYMERS CONSISTING OF COPOLYMERIZED UNITS OF AN ACYCLIC 1-OLEFIN AND A CYCLOOLEFIN HAVING FIVE CARBON ATOMS IN THE RING
Giulio Natta, Gino Dall'Asta, Giorgio Mazzanti, Italo Pasquon, Alberto Valvassori, and Adolfo Zambelli, Milan, Italy, assignors to Montecatini Edison S.p.A., Milan, Italy
No Drawing. Continuation of application Ser. No. 358,651, Apr. 9, 1964, which is a continuation-in-part of application Ser. No. 207,598, July 5, 1962. This application Mar. 15, 1967, Ser. No. 623,473
Claims priority, application Italy, Apr. 10, 1963, 7,420/63
23 Claims. (Cl. 260—88.2)

This application is a continuation of our application Ser. No. 358,651, filed Apr. 9, 1964, and now abandoned, which is a continuation-in-part of our application Ser. No. 207,598 filed July 5, 1962 and now abandoned.

This invention relates to new solid, unsaturated, essentially linear olefinic copolymers consisting of monomeric units derived from (1) ethylene or a higher alpha-olefin and (2) at least one cycloolefin or mono- or dialkylcycloolefin containing five carbon atoms in the ring, and to processes for producing the same.

Our pending parent application Ser. No. 207,598 filed July 5, 1962 discloses linear saturated high molecular weight copolymers of ethylene and cycloolefins containing from 4 to 8 carbon atoms in the ring, and in which the units derived from the cycloolefin are present in the copolymers in the form of cycloalkylenic units resulting from copolymerization of the cycloolefin only by opening of the double bond, the ring being retained; and processes for producing those copolymers with the aid of catalysts prepared, in general, from transition metal compounds and organometallic compounds and, in particular, from hydrocarbon-soluble vanadium compounds and organometallic compounds.

The object of this invention is to provide new, unsaturated copolymers of ethylene or higher alpha-olefin with one or more cycloolefins, in which only a portion of the cycloolefin is copolymerized by opening of the double bond while the remainder thereof is polymerized by opening of the ring, the double bond being retained.

In these new copolymers, only a portion of the units derived from the cycloolefin exist in the copolymer in the form of cycloalkylenic units, and the remainder of the units derived from the cycloolefin exist in the form of pentanamer units (according to the official nomenclature of the Int. Union of Pure and Applied Chemistry (I.U.P.A.C.), proposed by M. L. Huggins, J. Polymer Science, 8, 257, 1952).

These new unsaturated copolymers are made possible by the present invention in accordance with which it has been found, as a result of continuing research, that by selection of the cycloolefin to be copolymerized, and by selection of particular catalysts from among those mentioned in the parent application supra, or of the conditions for preparing the particular catalysts, it is possible to effect copolymerization of at least a portion of the cycloolefin by opening of the ring, instead of by opening of the double bond, which is retained and persists in the copolymer, providing sites of unsaturation along the copolymeric macromolecular main chain.

The selected cycloolefins or alkyl-cycloolefins which, when copolymerized with ethylene or a higher alpha-olefin with the selected catalyst according to the present invention, result in the unsaturated copolymers which are the object of this invention, are those cycloolefins and mono- or dialkyl-cycloolefins containing five carbon atoms in the ring, and having the following general formula:

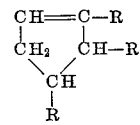

in which R represents hydrogen atoms or linear or branched alkyl groups containing 1 to 6 carbon atoms, which groups may be the same or different and the number of which bound to the ring is 0, 1 or 2.

Specific examples of the useful cycloolefins or alkyl-cycloolefins include cyclopentene, 2-methyl-cyclopentene-1, 3-methylcyclopentene-1, 4-methylcyclopentene-1, 3-ethyl-cyclopentene-1, 1,5-dimethylcyclopentene-1, 3-iso-butylcyclopentene-1 and 1-n-hexylcyclopentene-1.

Higher alpha-olefins which can be copolymerized with the cycloolefins or alkyl-cycloolefins under the present conditions, to yield the unsaturated copolymers, are those having the formula $CH_2=CHR$ in which R is an alkyl group containing 1 to 6 carbon atoms, and more particularly propylene or butene-1.

The selected catalysts which are used for preparing the present unsaturated copolymers are prepared from, specifically, titanium halides and organometallic compounds or hydrides of metals of Groups I–A, II and III of the Mendeleev Periodic Table. Preferably the titanium halide is one in which the metal is in its highest valency state, such as $TiCl_4$ or $TiBr_4$. However, titanium halides in which the metal has a valency lower than the maximum, such as $TiCl_3$ or $TiBr_3$, can also be used.

Organometallic compounds and hydrides of the Groups I–A, II or III metals which can be used in preparing the present selective catalysts include $Li(n-C_4H_9)$, $Li(C_6H_5)$, $LiAlH_4$, $Na(n-C_8H_{17})$, $Be(C_2H_5)_2$, $BeCH_3Cl$, $Mg(C_2H_5)_2$, $Mg(C_6H_5)_2$, $Mg(C_6H_5)Br$, $CaH_2CaH(C_2H_5)$, $Zn(C_2H_5)_2$, $Zn(C_2H_5)Cl$, $Cd(C_2H_5)_2$, $Al(C_2H_5)_3$, $Al(i-C_4H_9)_3$, $Al(n-C_6H_{13})_3$, $Al(C_6H_5)_3$, $Al(C_2H_5)_2Cl$, $Al(C_2H_5)F$, $Al(C_2H_5)_2Br$, $AlH(i-C_4H_9)_2$, $Al(C_2H_5)Cl_2$, $AlH_3$, $Al(isoprenyl)_3$, $Al(C_2H_5)_2OC_2H_5$, $Al(OC_2H_5)_2C_2H_5$.

Complexes of the organometallic compounds with electron donor compounds, such as ethers, amines, phosphines, onium salts and alkaline halides, can also be used.

Particularly good results are obtained using catalysts prepared from organometallic compounds of aluminum or beryllium, such as, for example, aluminum triethyl, aluminum tri-isobutyl, diethyl aluminum monochloride, aluminum trihexyl and beryllium diethyl.

The catalysts based on the titanium halides show a high degree of specificity in the present process involving the copolymerization of cycloolefins or alkyl-cycloolefins containing five carbon atoms in the ring. The specificity and selectivity are exhibited in the capacity of the particular catalysts to favor the copolymerization of the cycloolefins containing five carbon atoms in the ring by a mechanism such that at least a considerable portion of the cycloolefin copolymerizes by opening of the ring, rather than by opening of the double bond so that, in the resulting copolymers, at least some of the units derived from the cycloolefin exist as pentanamers having the formulae

or

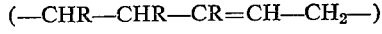

When a higher alpha-olefin is copolymerized with the cycloolefin or alkyl-cycloolefin containing five carbon atoms in the ring by the present process, using the present selected catalysts, nearly all of the units derived from the cycloolefin or alkyl-cycloolefin may exist as pentenamers in the copolymer chains.

The presence of the pentenamers in these copolymers sharply distinguish them from the copolymers described in the parent application, in which all of the units derived from the cycloolefin exist in the form of cycloalkylenic units. Distinguishing characteristics of the present copolymers are that they are unsaturated, are obtained from the cycloolefins or alkyl-cycloolefins containing five carbon atoms in the cycle, and may contain units derived from the higher alpha-olefins.

The double bonds contained in the units having the structure of a pentenamer can have a stereoregular structure, and can be all trans- or all cis-, or the double bonds can be non-stereoregular, the same copolymer containing units having the structure of a pentenamer and a cis configuration of the double bond, and units having the structure of a pentenamer and a trans configuration of the double bond.

The essential characteristic of all of the copolymers of this invention is the presence of a considerable number of sites of unsaturation in the chains thereof. Such unsaturations are present in the copolymer in the range up to some tens of mols per 100 units of copolymerized monomers and, being of the olefinic type, render the copolymer capable of undergoing various modifying reactions.

For instance, the copolymers may be subjected to peroxidation, followed by cross-linking of the double bonds. The peroxidation is facilitated by high temperatures, by atmospheric agents, more particularly oxygen, by light, and by catalyst residues present therein, if any. The cross-linking generally results in insolubilization of the copolymer. These transformations, if undesired, may be avoided by adding small amounts of antioxidants such as phenyl-beta-nephthylamine or hydroquinone, to the copolymer.

The unsaturations also render the copolymers capable of being cross-linked by vulcanization with conventional mixes which are preferably of the type used for vulcanizing low unsaturation rubbers (e.g., butyl rubber) when the copolymer has relatively low unsaturation (some percent units by mols) and of the type used for high unsaturation rubbers (e.g., natural rubber) when the copolymer has a relatively high unsaturation (some tens of percent units by mols). Particularly suitable for use with these copolymers are the mixes comprising sulfur and accelerators.

The double bonds contained in the pentenamer units can also be used for addition reactions with metal hydrides such as $LiH$, $NaBH_4$, $AlH(i-C_4H_9)_2$, etc. The metal-to-carbon bonds thus formed can be utilized for reacting the modified copolymers containing them with other reagents.

The presence of the double bonds (sites of unsaturation) in the pentenamer units present in the copolymer chains in an amount sufficient for a normal direct vulcanization of the copolymers make it unnecessary to introduce unsaturations by chemical after-treatment of the copolymers, as is necessary for transforming various other copolymers into rubber, such as, for instance, after-chlorinated ethylene/propylene copolymers having a low chlorine content (see C. Grespi and M. Bruzzone, La Chimica e L'Industria 43, 1394 (1961)).

The copolymers may be completely amorphous, or may exhibit crystallinity, depending on the amount of copolymerized cycloolefin.

In general, the copolymers of the ethylene with the cycloolefin are partially crystalline when the ethylene content is higher than 60% by mols, and the copolymers of higher alpha-olefins with the cycloolefins are partially crystalline when the higher alpha-olefin content is above 80% by mols. In all of the copolymers exhibiting crystallinity, the crystalline phase shows the characteristic bands of the homopolymer of the olefin which is present in excess in the copolymer, but the crystalline copolymers, while having, in general, properties similar to those of the homopolymer of the olefin present in excess, differ from said homopolymers in comprising the sites of unsaturation along the copolymer chains which render the copolymer capable of undergoing further reactions of the kind mentioned hereinabove.

Those copolymers of the present invention which exhibit crystallinity can be used to prepare various shaped articles, including films and other plastic objects.

The amorphous copolymers, i.e., those containing less than 60 mol percent of ethylene, or less than 80 mol percent of higher alpha-olefin, are useful for the preparation of elastomers.

The amorphous copolymers are, in general, much more soluble in organic solvents than the respective homopolymers. Generally speaking, the amorphous copolymers are extractable with boiling n-heptane, chlorinated hydrocarbons, and cold benzene. Boiling ethyl ether, on the other hand, dissolves only a portion of the crude (total) copolymerizate.

The proportion of the monomers, in mols, in the fraction extractable with boiling ether does not differ markedly from the proportion of the monomers, in mols, in the fraction which is insoluble in boiling ether but extractable with boiling n-heptane, or from the proportion of the monomers, in mols, in the crude copolymerizate. This confirms that each macromolecule of the polymerizate consists of units derived from each of the comonomers used, and that the polymerizates consist of copolymers and not of mixtures comprising homopolymers of either of the starting monomers.

The present copolymers are further characterized in having a homogeneous composition. In these copolymers, the units derived from the starting monomers are distributed randomly along the copolymer chains. The homogeniety of the copolymers is confirmed by the fact that from, e.g., an amorphous copolymer of ethylene and cyclopentene according to the invention, satisfactory vulcanizates can be obtained by means of the techniques normally used for the vulcanization of unsaturated rubbers. Such vulcanization is possible because of the presence in the copolymer chains of the pentenamer units containing a double bond, and because of the homogeneous distribution of such units in the macromolecules.

The good distribution of the unsaturations along the chain is confirmed by the fact that the vulcanizates are completely insoluble in aliphatic solvents and only swollen to a limited extent by some aromatic solvents.

Morover the vulcanized rubbers thus obtained have very good mechanical strength and a low permanent set.

The copolymerization of the cycloolefin or alkyl-cyloolefin and ethylene or higher alpha-olefin with the selected catalysts prepared from titanium halides can be carried out at temperatures between $-80°$ C. and $125°$ C.

The activity of the catalysts based on the titanium halides varies with the molar ratio between the catalyst-forming components. For instance, when the catalyst is prepared from the titanium halide and aluminum trialkyls, the most acitve catalysts are obtained when the aluminum trialkl to titanium halide molar ratio is between 1 and 5.

The copolymerization of ethylene or a higher alpha-olefin with the cycloolefins or alkyl-cycloolefins containing five carbons in the ring can be effected in an inert aliphatic, cycloaliphatic or aromatic hydrocarbon solvent, such as butane, pentane, n-heptane, cyclohexane, toluene, xylene, and mixtures thereof. Halogenated hydrocarbons which are inert to the catalyst, such as chloroform, trichloroethylene, chlorobenzenes, etc. can also be used as the liquid copolymerization medium or diluent.

Particularly high copolymerization rates, and copolymers having a particularly high content of pentenamer units, can be obtained by effecting the copolymerization with the selected catalysts in the absence of an extraneous inert solvent, that is by using the monomers in the liquid state, for example by dissolving ethylene or the higher alpha-olefin in the cycloolefin, and maintaining the monomers in the liquid state. Moreover, a high cycloolefin concentration favors the copolymerization of the cycloolefin by opening of the cycle.

For obtaining copolymers having a highly homogeneous composition, it is preferred to maintain the ratio of the two comonomers in the reacting liquid phase constant, or as nearly constant as possible, during the copolymerization. This can be accomplished by effecting the copolymerization continuously, by continuously feeding and discharging a mixture of the monomers having a constant composition, and by operating at high flow-rates.

The compositions of the copolymers can be varied within wide limits, by varying the compositions of the mixtures of monomers. The copolymer can contain from 60 to 98 mols percent of the straight chain olefin and from 2 to 40 mols percent of the cycloolefin.

The cycloolefin units can be of the cyclo alkylenamer type or of the pentenamer type. The first units range between 20 and 70 mols percent and the latter units between 30 and 80 mols percent of the total units derived from the cycloolefins.

The amount of straight chain olefin which must be present in the monomers mixture in order to obtain the above molar proportions in the copolymer varies depending on the various olefins. In case of ethylene the ethylene molar fraction may vary from 0.001 to 0.1 and therefore the cycloolefin molar fraction may vary from 0.9 to 0.999; in case of propylene the propylene molar fraction may vary from 0.005 to 0.2 and therefore the cycloolefin molar fraction may vary from 0.995 to 0.8; in case of butene the butene molar fraction may vary from 0.9 to 0.1 and therefore the cycloolefin molar fraction may vary from 0.1 to 0.9. In all cases the above cycloolefin molar fractions can be partially substituted with an inert hydrocarbon diluent.

Since the elastomers obtained by vulcanizing the present copolymers have excellent mechanical properties, they can be used for preparing shaped articles of various kinds, including pipes.

The following examples are given to illustrate the invention and are not intended to be limiting.

Example 1

The copolymerization vessel consists of a 200 cc. cylindrical apparatus provided with a side tube and cock for feeding ethylene. Air is completely removed from this vessel and replaced by anhydrous nitrogen. The reaction apparatus is then completely immersed in a thermostatic bath kept at the constant temperature of −30° C.

The apparatus is agitated by means of a shaking device (90–100 shakes/minute).

10.0 g. (0.147 mols) of pure cyclopentene, previously distilled on metallic sodium are introduced.

The catalyst, prepared immediately before starting the run, at −30° C. under nitrogen by mixing 5.0 millimols of tri-n-hexyl aluminum with a solution of 3.6 millimols of titanium tetrachloride in 37 cc. of anhydrous n-heptane, is then added.

After having introduced cyclopentene and the catalytic system into the polymerization vessel, an absolute total pressure of 50 torr is adjusted therein at −30° C. by means of nitrogen.

Agitation is started and the apparatus is connected (by opening the stop cocks) with a vessel containing radioactive ethylene having a known specific activity. The absolute total pressure in the reactor is maintained by means of a bubbler filled with butyl phthalate under a pressure of 800 torr.

Therefore in the polymerization apparatus there are the following partial pressures:

(a) ethylene partial pressure=50 torr
(b) nitrogen+solvent+cyclopentene partial pressure=750 torr.

Since the conversion of cyclopentene is rather limited, the variations with time in the ratio between the concentrations of ethylene and cyclopentene are small. The copolymerization time is 7 hours. The equilibrium between ethylene in the gaseous phase and that present in the liquid phase is insured by vigorous agitation.

The copolymerization is stopped by pouring the reaction product into an excess of methanol (500 cc.) containing 5 cc. of conc. hydrochloric acid. After some hours, the precipitated copolymer is filtered, washed with boiling methanol and dried under reduced pressure at 100° C.

1.65 g. of a solid copolymer having a granular appearance are thus obtained.

The ethylene content of the copolymer determined by radiochemical analysis amounts to 62.8% by weight (corresponding to 80.2% by mols).

The intrinsic viscosity, determined in tetrahydronaphthalene at 135° C., is 3.5 (100 cc./g.).

The infrared spectrographic examination shows, in addition to the presence of methylenic sequences having a crystallinity of polyethylenic type (bands at 13.7 and 13.9 microns), also the bands characteristic of double bonds of the trans type (10.35 microns) and the bands characteristic of the cycles (3.78 microns). The bands characteristic of other double bond types appear to be absent. This shows that cyclopentene has been polymerized in part by opening of the double bond and in part by opening of the cycle.

About 20% by mols of the copolymer is made up of units derived from cyclopentene.

Example 2

The copolymerization of ethylene (marked with $C^{14}$) with cyclopentene is carried out as described in Example I using a catalyst prepared from 36 millimols of $Al(C_2H_5)_3$ instead of 9 millimols of $Al(C_6H_{13})_3$. By proceeding as described in Example 1, 0.3 g. of a granular copolymer containing 43% by weight of ethylene (65% by mols) determined by radiochemical analysis are obtained.

The infrared spectrographic analysis shows not only the presence of methylenic sequences having crystallinity of polyethylenic type (bands at 13.7 and 13.9 microns) but also the bands characteristic of double bonds of the trans type (10.35 microns) and the bands characteristic of the cycles (3.78 microns).

The bands characteristic of other types of double bond appear to be substantially absent.

About 30–35 mols percent of the copolymer is made up of units derived from cyclopentene.

From the infrared spectrographic examination it can be deduced that the percent of unsaturated monomeric units derived from cyclopentene copolymerized by opening of the cycle is greater than the percent of saturated monomeric units derived from cyclopentene copolymerized by opening of the double bond.

Example 3

The copolymerization of ethylene (marked with $C^{14}$) with cyclopentene is carried out as described in Example 1 but the catalyst is directly prepared in the presence of the monomers, without using any extraneous diluent. The following amounts of reactants are used:

Pure cyclopentene (15.4 g.) _____ cc___ 20
Titanium tetrabromide _____ millimols___ 3.6
Aluminum triethyl _____ do____ 9

The copolymerization is carried out as in Example 1 at −30° C. under an ethylene pressure of 50 torr. The polymerization time is 14 hours.

By carrying out the purification of the polymer as described in Example 1, 0.4 g. of a powdery polymer containing 50% by weight (corresponding to 71% by mols)

of units deriving from ethylene (determined by radiochemical analysis) are obtained.

The infrared spectrographic examination shows, in addition to the presence of methylenic sequences having the crystallinity of the polyethylenic type (bands at 13.7 and at 13.9 microns) also the bands characteristic of the trans double bonds (10.35 microns) and the bands characteristic of the cycles (3.78 microns). The bands characteristic of other types of double bonds are substantially absent.

The copolymer contains about 30% by mols of monomeric units deriving from cyclopentene. More than one half of these units (15 to 18% by mols of the total copolymer) consist of pentenamers having trans structure of the double bonds.

Example 4

The copolymerization of ethylene (marked with $C^{14}$) with cyclopentene is carried out as described in Example 3 but using the following reactants:

| | |
|---|---:|
| Pure cyclopentene (15.4 g.) _____cc__ | 20 |
| Titanium tetrachloride _____millimols__ | 3.6 |
| Aluminum diethyl monochloride _____do____ | 18 |

The copolymerization is carried out as in Example 1 at —30° C., with an ethylene partial pressure of 50 torr for 14 hours.

By purifying the copolymer as described in Example 1, 0.9 g. of a powdery product containing 52% by weight (corresponding to 73% by mols) of units deriving from ethylene (determined by radiochemical analysis) are obtained.

The infrared spectrograph examination shows, in addition to the presence of methylenic sequences having the crystallinity of polyethylenic type, also the bands characteristic of trans double bonds (10.35 microns) and the bands characteristic of the cycles (3.78 microns).

The cyclopentene units contained as pentenamers with trans structure of the double bonds amount to some moles per 100 mols of the total copolymer.

Example 5

The copolymerization of ethylene (marked with $C^{14}$) with 4-methyl cyclopentene-1 is carried out as described in Example 1 by using the following reactants:

| | |
|---|---:|
| 4-methylcyclopentene-1 _____cc__ | 10 |
| Titanium tetrachloride _____millimols__ | 2 |
| Aluminum trihexyl _____do____ | 6 |

The copolymerization is carried out as in Example 3, at —30° C. under a partial pressure of 50 torr for 7 hours.

By purification of the copolymer as described in Example 1, 1.3 g. of a granular product containing 68% by weight (corresponding to 84% by mols) of units deriving from ethylene (determined by radiochemical analysis) are obtained.

The infrared spectrographic examination shows the presence of methylenic sequences having crystallinity of polyethylenic type (bands at 13.7 and 13.9 microns) and of bands characteristic of trans double bonds (10.35 microns). The last two bands are those of the 4-methylcyclopentene-1 units contained in the copolymer.

The amount of trans double bonds corresponds to some percent units by mols of trans-methylpentenamer units deriving from the opening of the ring of 4-methylcyclopentene.

The intrinsic viscosity of the copolymer (determined in tetrahydronaphthalene at 135° C.) is 1.6.

Example 6

The reaction apparatus consists of a 100 cc. three-necked pear-shaped flask provided with an agitator and with gas inlet and outlet tubes.

30 cc. of pure cyclopentene, previously distilled on metallic sodium, are introduced into the apparatus deaerated and kept at —20° C. Propylene is then introduced through the gas inlet tube and is circulated through cyclopentene-1 with a flow-rate of 50 Nl/h.

After 15 minutes of saturation, 2 millimols of $TiCl_4$ and 5 millimols of aluminum tri-n-hexyl are added. Propylene is continuously circulated at the flow-rate of 50 Nl/h. After 1 hour from the introduction of the aluminum trihexyl, the reaction is stopped by the addition of 10 cc. of methanol containing 0.1 g. of phenyl-beta-naphthylamine.

The product is purified and isolated as described in Example 1.

After vacuum drying, 0.8 g. of a solid product having the appearance of a non-vulcanized elastomer and being completely soluble in boiling n-heptane is obtained.

The infrared spectrographic examination shows the presence of methyl groups (band at 7.25 microns) and of inner double bonds of the trans type (band at about 10.35 microns).

The product can be vulcanized with the known mixes comprising sulfur and accelerators.

Example 7

A 250 cc. flask provided with an agitator, a nitrogen inlet tube and a cooling bath is kept under nitrogen and cooled to —30° C. The following compounds are then introduced:

| | |
|---|---:|
| Pure cyclopentene _____g__ | 11.55 |
| Butene-1 _____g__ | 11.2 |
| Titanium tetrachloride _____millimols__ | 3.6 |
| Aluminum triethyl _____do____ | 9 |

The whole is agitated at —30° C. for 6 hours.

The copolymer is precipitated and purified as described in Example 1.

0.8 g. of a slightly elastic, non-tacky polymer are thus obtained. By infrared spectrographic examination it appears to consist of polybutene chains containing 1% by mols of cyclopentene in the form of trans pentenamer units (band at 10.35 microns).

The intrinsic viscosity, determined in tetrahydronaphthalene at 135° C., is 1.5.

Example 8

By operating as described in Example 1, ethylene marked with $C^{14}$ is copolymerized with 3-methyl-cyclopentene-1, using the following reactants:

| | |
|---|---:|
| 3-methyl cyclopentene _____cc__ | 5.0 |
| Titanium tetrachloride _____millimols__ | 1.0 |
| Aluminum trihexyl _____do____ | 2.5 |

The copolymerization is carried out at —30° C., with an ethylene partial pressure of 50 torr for 7 hours.

0.50 g. of a slightly elastic product containing 71% by weight (88% by mols) of ethylene units (determined by radiochemical analysis) are obtained.

The infrared spectrum shows the presence of methylene sequences with crystallinity of polyethylenic type (bands at 13.7 and 13.9 microns) and bands characterized of trans double bonds (10.35 microns).

The trans double bonds belong to units deriving from the opening of 3-methylcyclopentene-1, namely to units of trans-methylpentenamer.

As will be obvious, some modifications may be made in practicing the invention without departing from the essential spirit thereof. Accordingly, it is intended to include in the scope of the appended claims all such modifications as will be apparent from the description and detailed illustrative examples given herein.

We claim:

1. High molecular weight, substantially linear, unsaturated, vulcanizable random copolymers the macromolecules of which consist of copolymerized units of an olefin selected from the group consisting of ethylene and higher alpha-olefins of the formula $CH_2=CHR$ in which R is an alkyl group containing 1 to 6 carbon atoms, and of a cycloolefin having the formula

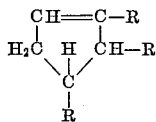

in which R is selected from the group consisting of hydrogen, linear alkyl groups containing 1 to 6 carbon atoms and branched alkyl groups containing 1 to 6 carbon atoms, the number of said alkyl groups bound to the ring being 0, 1 or 2, the copolymers being characterized in containing about 60 to 98 moles percent of the monoolefin and about 2 to 40 mol percent of the cyclic olefin, and being further characterized in that some of the copolymerized units of the cycloolefin are present in the copolymer chains as units having the structure of a pentenamer, and some of the units of the copolymerized cycloolefin are present in the cyclic form.

2. Copolymers according to claim 1, characterized in that the macromolecules consist of copolymerized units of ethylene and copolymerized units of cyclopentene-1.

3. Copolymers according to claim 2, further characterized by showing, on X-ray examination, the crystallinity characteristic of polyethylene.

4. Copolymers according to claim 2, further characterized in being amorphous on X-ray examination.

5. Copolymers according to claim 1, characterized in that the macromolecules consist of copolymerized units derived from ethylene and copolymerized units of 3-methyl-cyclopentene-1.

6. Copolymers according to claim 1, characterized in that the macromolecules consist of copolymerized units of ethylene and copolymerized units of 4-methyl-cyclopentene-1.

7. Copolymers according to claim 6, further characterized by showing, on X-ray examination, the crystallinity characteristic of polyethylene.

8. Copolymers according to claim 6, further characterized in being amorphous on X-ray examination.

9. Copolymers according to claim 1, characterized in that the macromolecules consist of copolymerized units of propylene and copolymerized units of cyclopentene-1.

10. Copolymers according to claim 9, further characterized in containing at least 80% by mols of propylene and in showing, on X-ray examination, crystallinity of polypropylene essentially consisting of isotactic macromolecules.

11. Copolymers according to claim 9, further characterized in being amorphous on X-ray examination.

12. Copolymers according to claim 1, characterized in that the macromolecules consist of copolymerized units of butene-1 and units of cyclopentene-1.

13. Copolymers according to claim 12, further characterized in containing at least 80% by mols of butene-1, and in showing, on X-ray examination, the crystallinity characteristic of polybutene-1, essentially consisting of isotactic macromolecules.

14. Copolymers according to claim 12, further characterized in being amorphous on X-ray examination.

15. Manufactured shaped articles of copolymers according to claim 1, which exhibit crystallinity on X-ray examination.

16. Copolymers according to claim 1, sulfur-vulcanized to elastomers.

17. Elastomers comprising vulcanized copolymers according to claim 1, which are amorphous on X-ray examination.

18. A process for preparing unsaturated copolymers as defined in claim 1, which comprises copolymerizing a mixture of the monomers in contact with a catalyst prepared by mixing a titanium halide with a compound of a metal belonging to one of the Groups I-A, II and III of the Mendeleev Periodic Table and selected from the group consisting of organometallic compounds and hydrides of said metals.

19. The process according to claim 18, characterized in that the monomers are copolymerized in the liquid state, in the absence of extraneous solvents.

20. The process according to claim 18, characterized in that the monomers are copolymerized in a solvent which is inert to the catalyst and selected from the group consisting of aliphatic, cycloaliphatic and aromatic hydrocarbons, mixtures thereof, and halogenated hydrocarbons.

21. The process according to claim 18, characterized in that the monomers are copolymerized at a temperature between $-80°$ C. and $+125°$ C.

22. Manufactured shaped articles of copolymers according to claim 1, which are amorphous on X-ray examination.

23. Manufactured shaped articles of vulcanizates according to claim 16.

References Cited

UNITED STATES PATENTS

| 3,074,918 | 1/1963 | Eleuterio | 260—93.1 |
| 3,058,963 | 10/1962 | Vandenberg | 260—88.2 |
| 2,945,845 | 7/1960 | Schmerling | 260—88.2 |

FOREIGN PATENTS

| 553,655 | 6/1957 | Belgium. |
| 619,877 | 5/1962 | Belgium. |

JOSEPH L. SCHOFER, *Primary Examiner.*

M. B. KURTZMAN, *Assistant Examiner.*